United States Patent
Rogalski et al.

(10) Patent No.: US 7,515,702 B2
(45) Date of Patent: Apr. 7, 2009

(54) METHOD AND SYSTEM FOR DOWNLOADING AUDIO SAMPLES FOR PERSONALIZED TELEPHONE RING TONES

(75) Inventors: Gary Rogalski, Richmond (CA); Douglas Charney, Richmond (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 666 days.

(21) Appl. No.: 10/400,406

(22) Filed: Mar. 28, 2003

(65) Prior Publication Data

US 2004/0131175 A1    Jul. 8, 2004

Related U.S. Application Data

(60) Provisional application No. 60/438,528, filed on Jan. 8, 2003.

(51) Int. Cl.
    *H04M 1/00*   (2006.01)
    *H04M 3/00*   (2006.01)
(52) U.S. Cl. ................................. 379/373.04
(58) Field of Classification Search ............ 379/373.04
    See application file for complete search history.

(56) References Cited

U.S. PATENT DOCUMENTS

| | | | |
|---|---|---|---|
| 5,481,599 A * | 1/1996 | MacAllister et al. ... | 379/101.01 |
| 5,794,141 A | 8/1998 | Zicker | |
| 5,854,826 A | 12/1998 | Kim | |
| 5,930,703 A | 7/1999 | Cairns | |
| 6,002,761 A * | 12/1999 | Sremac ................... | 379/373.04 |
| 6,032,112 A | 2/2000 | Onishi et al. | |
| 6,496,692 B1 * | 12/2002 | Shanahan ................ | 455/418 |
| 6,611,681 B2 * | 8/2003 | Henderson ............... | 455/413 |

FOREIGN PATENT DOCUMENTS

| | | |
|---|---|---|
| EP | 1 182 848 | 2/2002 |
| GB | 2 193 419 | 2/1988 |
| GB | 2 220 822 | 1/1990 |
| GB | 2 301 261 | 11/1996 |
| GB | 2 329 555 | 3/1999 |
| GB | 2 343 082 | 4/2000 |
| JP | 10013499 | 1/1998 |
| WO | WO 00/52909 | 9/2000 |
| WO | WO 01/84809 | 11/2001 |

OTHER PUBLICATIONS

GB Search Report dated May 27, 2004.
Examination Report dated Jun. 21, 2006.

* cited by examiner

*Primary Examiner*—Alexander Jamal
(74) *Attorney, Agent, or Firm*—Paul, Hastings, Janofsky & Walker LLP

(57) ABSTRACT

Systems and methods are described for downloading audio signals into a digital telephone to update and replace a conventional ringer tone. The source of the audio signal can be from any analog audio sound source, such as a radio, PC sound card, MP3 player, CD or DVD player, etc. The audio signal can be fed through an audio cable into a handset headset jack that is already available in most digital telephones, or into a specialized audio jack incorporated into the base (of a cordless telephone). The audio signal may be comprised of a song or speech. The audio signal can be stored in a specialized memory for storing audio signals without requiring encoding the signal prior to storage, or it can be stored in any conventional memory arrangement. For a cordless telephone, the audio signal may be stored in the handset or in the base unit.

16 Claims, 9 Drawing Sheets

METHOD AND SYSTEM FOR DOWNLOADING AUDIO SAMPLES FOR PERSONALIZED TELEPHONE RING TONES

This application claims the benefit of U.S. Provisional Application No. 60/438,528, filed Jan. 8, 2003, which is hereby incorporated by reference by in its entirety.

BACKGROUND

1. Field of the Invention

The present invention relates generally to telephone ring signaling systems, and more particularly to methods for customizing selection of ring tones for a telephone.

2. Background of the Invention

In recent years, there have been significant advancements in capabilities and features provided in telephone systems. In addition to the standard functionality for placing telephone calls, modern telephones now include calling logs and telephone directories, and allow users to adjust ring volume, ring tone, and displays, among many other features. Whereas telephones had once been thought of as being simple and interchangeable, modem telephone systems now can be customized according to users' unique preferences.

There are many reasons why users customize the operation of their telephones. First, many features that are now available on telephone systems facilitate more efficient and convenient telephone usage. For example, telephone users create personalized telephone directories to save time that would otherwise be spent searching for forgotten telephone numbers. As another example, a user might adjust the ring volume to a louder setting so as not to miss a call while outside or to a softer setting so as not to disturb a sleeping child. Features such as calendars and calculators, alarm clocks and call timers are popular with users because they add convenient functionality in an easily accessible, portable electronic device.

Another reason why users customize their telephones is because users simply enjoy configuring personal telephones to their tastes and preferences as a form of self-expression. For example, most cellular telephones enable users to create personal welcoming messages on the display, choose from dozens of different audible ring tones, and even customize the external appearance of the telephone through artistic faceplates. Since users are spending more and more time of each day communicating over a telephone, and carry cordless telephones throughout their houses and cellular telephones wherever they travel, it is not unexpected that many users seek to maximize the enjoyment of their telephones.

Of all the features provided in modern telephones that can be personalized, the selection of ring tones is perhaps one of the most popular. Most cellular telephones now include a list of different "tunes" that can be played instead of the standard 'ringing' sound that used to be associated with a telephone. Long gone are the days when a telephone included an actual bell for generating a ringing signal to indicate an incoming call—now telephones can select between tunes such as "Auld Lang Syne" and "Happy Birthday." Users may periodically change their selected ringer "tune" to distinguish their phone from others (e.g., when there are multiple phone lines in a house), or simply for the sake of variety.

Once telephone manufacturers discontinued the use of actual ringing bells in telephones, simulated "ringing" signals were generated by means of a piezoelectric tone generator. Such telephones could signal an incoming call by sending a pulsed electrical signal to the generator to create a 'staccato-styled' monotone. Users could adjust the volume of the ring, and perhaps the rhythm of the pulsed signal, but no additional customization was available.

Upon the advent of digital telephones, "ringers" were changed to utilize tone generators capable of playing different frequencies, or "notes." The ringer systems that are provided on most conventional digital telephones, whether for use in a landline or wireless network, operate by altering the frequency of a single tone to create a musical scale. For each available song, the memory within the telephone stores a sequence of quantized frequencies or "notes" of the song. Typically, the memory is located within the handset of either a cordless or a cellular telephone. Since the amount of memory space is finite, a song usually consists of a repeating section of a recognizable "tune." Thus, while the tune is sufficiently recognizable to be amusing, the quality of sound is usually rather poor. Some telephones include a multi-tone (polyphonic) tone generator, but this only marginally improves the quality of sound.

Although many users appreciate the variety of choosing between a dozen or so ringer "tunes" on a digital telephone, most of these tunes are merely novelty songs that quickly become tiresome. For example, while a user might enjoy setting a telephone ringer to play the "Happy Birthday" tune during his/her birthday, this tune might not otherwise be selected.

During the past few years, it has become known to download music samples as .wav files or MP3 files, or receive streams of music as RealAudio or Windows Media streaming files. Such technologies enable users to store, in digital form, high quality reproductions of music on computer memory. Due to recent advances in semiconductor storage capacity, it also has become known to store voice data (such as in dictaphones, digital answering machines, etc.) on memory cards for life-like play back. However, systems and methods are not known for improving the sound reproduction of ring tones in digital telephones.

Accordingly, there is a need for a method and system for improving the quality of ring tones in digital telephones.

SUMMARY OF THE INVENTION

Systems and methods are described for downloading audio signals into a digital telephone to update and replace a conventional ringer tone. The source of the audio signal can be from any analog audio sound source, such as a radio, PC sound card, MP3 player, CD or DVD player, television, etc. The audio signal can be fed through an audio cable into a handset headset jack that is already available in most digital telephones, or into a specialized audio jack incorporated into the base (of a cordless telephone). The audio signal may be comprised of a song or speech.

The audio signal can be stored in a specialized memory for storing audio signals without requiring encoding the signal prior to storage, or it can be stored in any conventional memory arrangement. For a cordless telephone, the audio signal may be stored in the handset or in the base unit. When configured to be stored in the base unit, the signal is transmitted over an RF link to the handset during signaling of an incoming call.

A method is described for providing user-customized audio samples as ring tones on a digital telephone. An audio signal is received at an input jack of a telephone. The audio signal is stored in telephone memory, a memory location in the memory is associated with a customized ring tone. Upon receiving a control signal to generate a ring tone, the audio signal is retrieved from memory, amplified and provided to an external telephone speaker as a ring tone.

A digital telephone is described for providing customized audio samples as ring tones. An interface is provided for receiving an analog audio signal. A memory in the digital telephone stores an audio signal, and a controller retrieves a stored audio signal in response to a command to generate a ring tone.

An additional method is described for configuring a telephone to provide user-customized audio samples as ring tones. An audio source is connected to an input jack of a telephone. A selection is made to store an audio signal in telephone memory. The audio source is played to upload an audio signal while the telephone is in a recording mode. Upon detection of a control signal to generate a ring tone, the audio signal is retrieved from memory, amplified and provided to an external telephone speaker as a ring tone.

DETAILED DESCRIPTION OF THE PREFERRED EMBODIMENTS

Embodiments of the present invention as described herein are directed to methods and systems for upgrading a ring tone in a telephone with a personalized ring signal received from an external audio source. Unlike many portable electronic devices, such as printers, digital cameras, MP3 players, etc., which are designed to communicate with a personal computer via peripheral ports in the course of normal operation, portable electronic devices such as cordless telephones or mobile, cellular telephones do not typically include a data port for communication with another electronic device. Therefore, in order to input a signal through a telephone base or a handset, it is usually necessary to provide an input port and associated circuitry. In that instance, additional parts must be included and design costs are incurred that are not associated with normal telephony operations. Furthermore, it is possible that many consumers who purchase cordless telephones or mobile telephones do not have a personal computer or a special computer cable required for connecting devices to the input port of the telephone. These consumers will not be able to utilize the input port for upgrading or customizing the telephone, and the added cost associated with incorporating this feature will be wasted.

Although most portable electronic devices, especially cordless telephones and mobile telephones, do not utilize an input data port, it is common for such devices instead to include an audio input/output interface, or "audio jack," for communicating data in an audio band to and from the device. In a cordless telephone or mobile telephone, for example, this interface is typically configured as a "headset jack" for connecting (or "plugging in") a mini microphone and speaker assembly to enable hands-free communications. Such headset jacks are common in modern cordless telephones, and use of these interfaces is a requirement for operating a mobile, cellular telephone in many jurisdictions while driving a motor vehicle.

Figure 1:
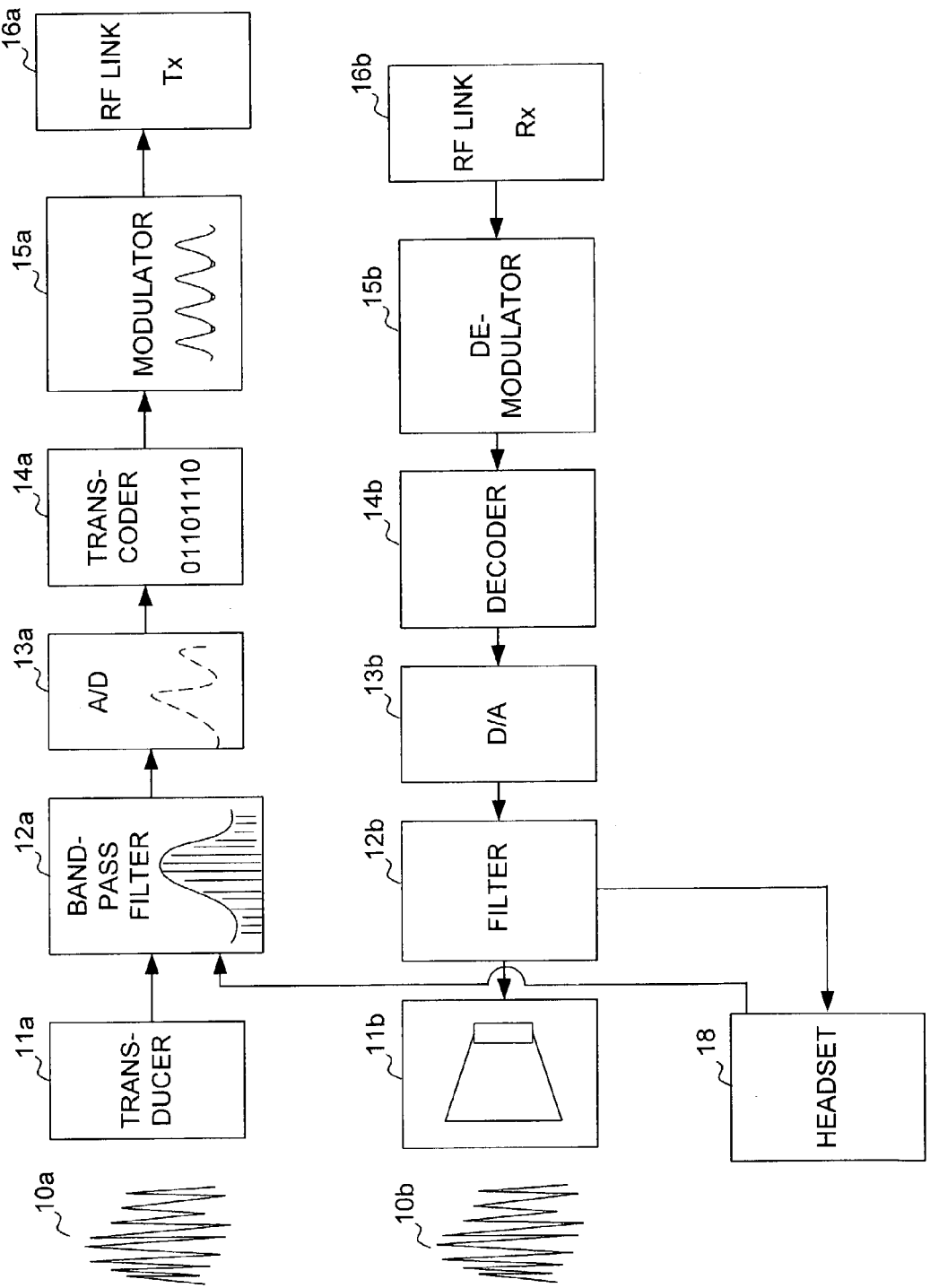
FIG. 1 is a schematic diagram illustrating a bypass arrangement of a headset in a handset of a cordless telephone.

A headset bypasses the microphone and receiver that are integrated into the telephone. As shown in FIG. 1, a telephone transmits a voice signal from a user by converting spoken voice vibrations 10a into an analog electrical signal via a transducer 11a, which is then filtered via a bandpass filter 12a and sampled in an analog-to-digital converter 13a at a sufficiently high rate to capture the voice signal (e.g., according to the Nyquist rate). In a cordless telephone, the digital signal is then transcoded (or compressed) 14a and modulated 15a for transmission over an RF link 16a to a base unit, where it is demodulated, decompressed, converted back to an analog signal and ultimately transmitted along the PSTN. Voice signals are received in the speaker of the handset by being received through RF link 16b, demodulated in demodulator 15b, and decompressed in decoder 14b. The signal is then converted back to an analog signal from D/A converter 13b, filtered 12b, and sent to a speaker 11b. A headset 18 replaces the transducer and speaker assembly 11a, 11b that is integrated into the telephone.

In a preferred embodiment of the present invention, a digital telephone that contains an audio jack and digital processing circuitry or specialized memory for storing audio information is configured to enable replacing a conventional ring tone in the device with a signal input from any of a number of possible deployment options, each via a temporary connection through the audio jack. The input source need not be a digital or encoded signal, but instead may be an analog audio signal output from any device that is capable of inputting an audio signal into an audio jack. In addition to personal computers and laptops, this might include compact disc players, radios, MP3 players, cassette players, VCRs, or any other source that is conventionally available to a typical consumer. Using an audio jack that is already in use in a modern telephone can add functionality while minimizing incremental costs. Further, the existing GUI capabilities and simplicity of connecting audio devices to the device's audio jack provides an easy-to-use system.

Figure 2:
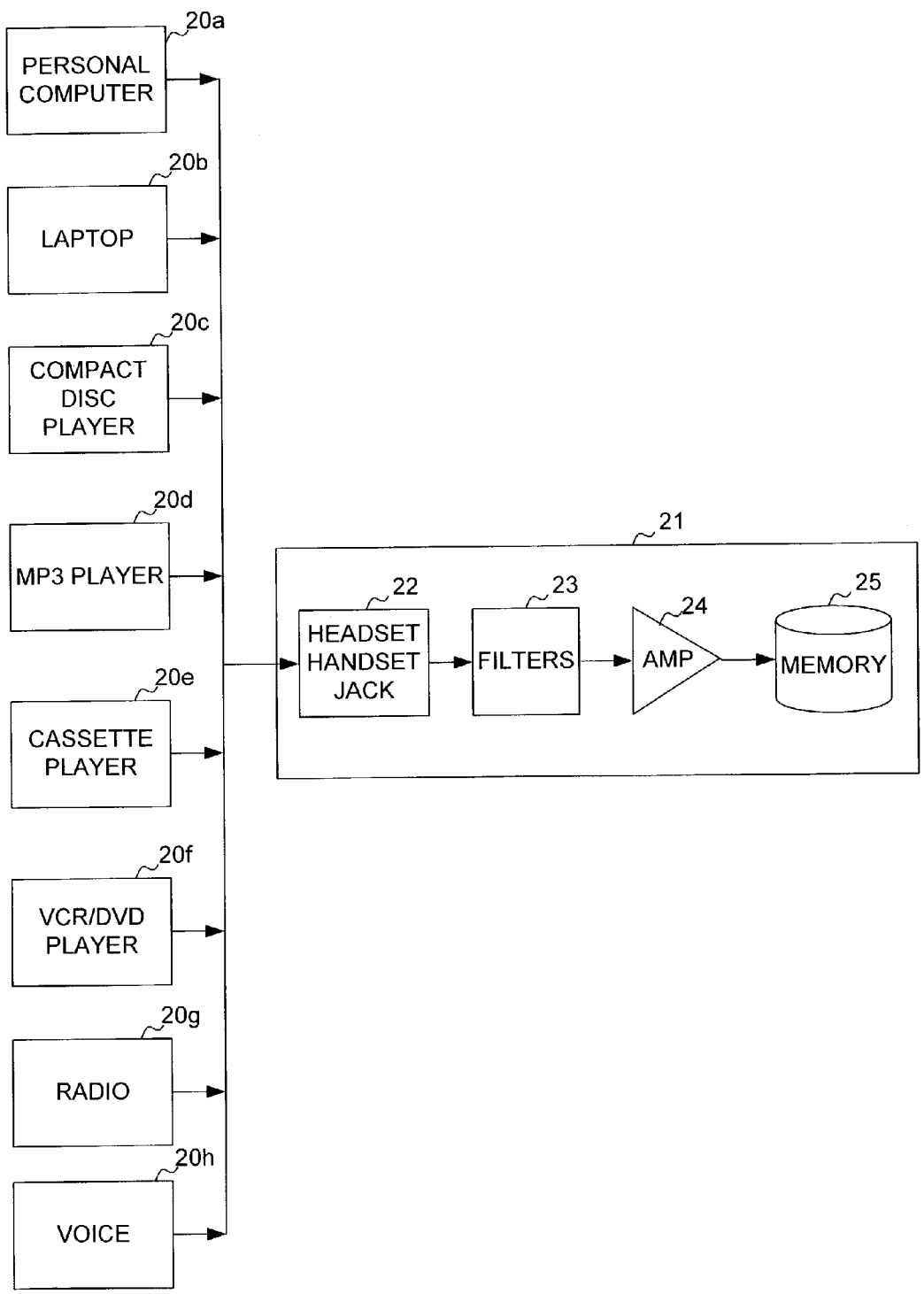
FIG. 2 is a schematic diagram illustrating connection of one of a plurality of sources of audio signals to a handset of a telephone in accordance with an embodiment of the present invention.

FIG. 2 represents the usage models for inputting an audio signal into a digital cordless telephone or mobile cellular telephone, according to embodiments of the present invention. Using a standard audio cable with stereo or mono plugs, the audio input jack of a telephone 21 can connect to an audio output of a personal computer (the audio output jack of the personal computer is typically connected to computer desktop speakers) 20a or laptop 20b, or any of a host of media players, including a compact disc player 20c, MP3 player 20d, audio cassette player 20e, video cassette player 46, DVD or VCR player 20*f*, or radio 20*g*. Instead of a music signal, a user alternatively may simply connect, for example, a microphone for live music or voice 20*h*.

For the purposes of this diagram, the components of telephone 21 are illustrated as being in a single unit, although in a cordless telephone, the components may be separated into handset components and base station components (as will be described in further detail below). The telephone 21 includes an audio input jack 22, filters 23, and amplifier 24 and programmable memory 25. The programmable memory may be RAM, EPROM, FLASH, or any specialized memory for storing audio signals.

Many of the sources of audio input 20*a*-20*h* can be utilized differently to provide an upgraded ring tone according to different business models. Preferably, users can download an audio signal by simply synchronizing play back of a favorite song excerpt from an audio source while recording the excerpt into memory of the telephone, during a telephone "programming" mode. As an alternative, an after-market provider can sell "ringer excerpts," synchronized to provide only the "hook" or chorus of a song, which can be downloaded from desktop or laptop computers as ".wav" files or MP3 files, or receive RealAudio™ or Windows Media™ streams. In this manner, users can continually update the ringer with new song excerpts without having to purchase a copy of the entire song. It is also conceivable that consumers can subscribe to receive downloadable audio advertisements, perhaps for an airtime credit. As can be appreciated, this method enables a consumer to easily upgrade the ringer tone by simply plugging the device to the audio output jack of the consumer's audio equipment.

Figure 3:
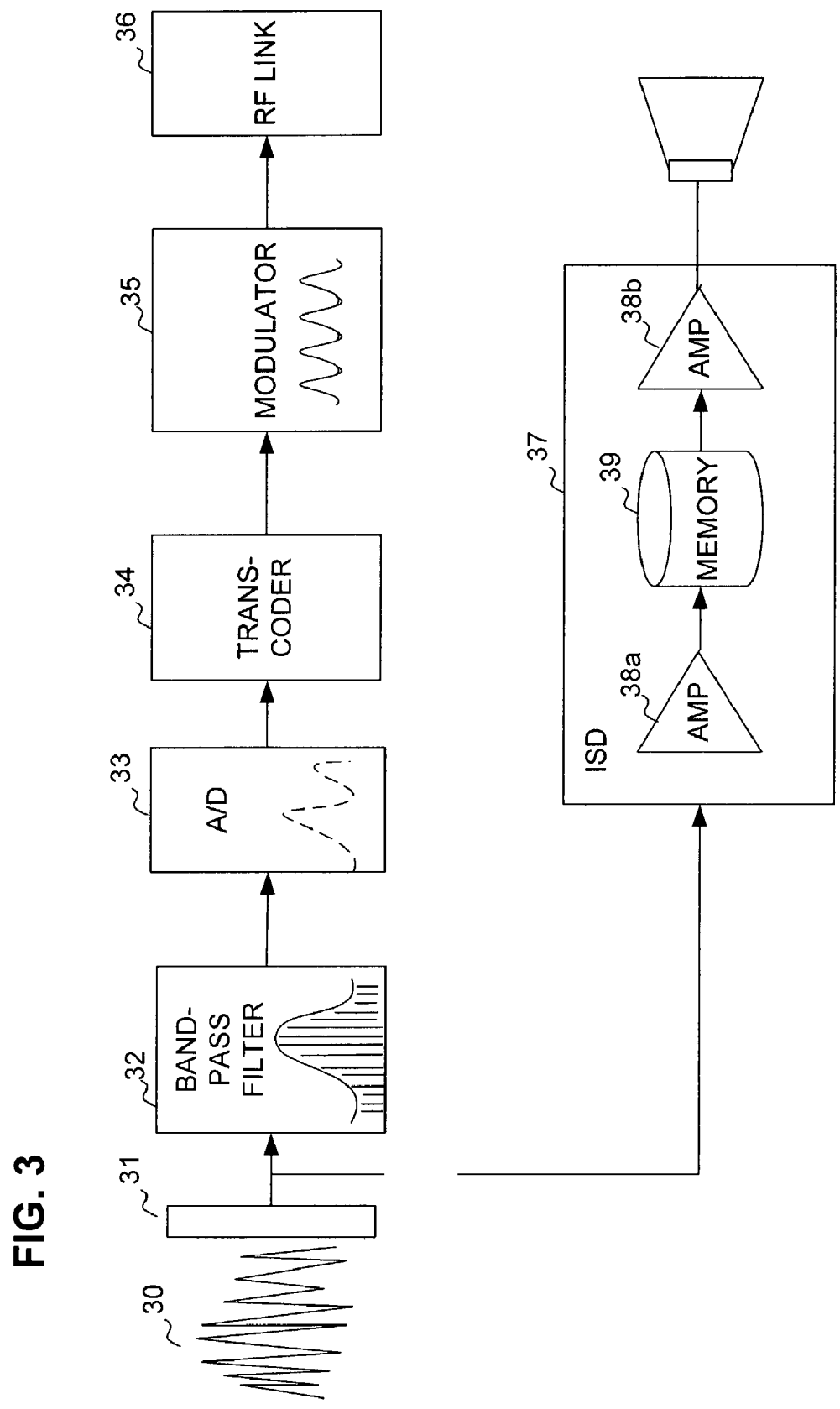
FIG. 3 is a schematic diagram illustrating a bypass arrangement for incoming audio signals in a handset, in accordance with an embodiment of the present invention.

FIG. 3 is a schematic diagram illustrating a bypass of components in a headset of a cordless telephone for storing a customized ring signal in the headset according to an embodiment of the present invention. As can be seen, the audio signal 30 is fed through headset jack 31 and is input to the handset as is shown in FIG. 1. Instead of forwarding the signal to band pass filter 32, A/D converter 33, transcoder 34, modulator 35, and RF link 36 to send the audio signal to the base station for transmission along the PSTN, a controller in the handset (shown in FIG. 5 below) switches the transmission directly to an internal memory unit 37 in the handset. As an example, the memory unit shown in FIG. 3 can be a specialized memory, such as that provided by Integrated Storage Devices, known as ChipCorder Technology®, which provides a single chip for audio recording and playback in a variety of consumer communications. It uses a multilevel storage methodology in which one of more than 250 distinct voltage levels are precisely stored per memory cell. This provides approximately eight times more storage space for any given memory size than the alternative two-level (binary) digital storage technology. ChipCorder® technology enables voice and audio signals to be stored directly in their natural form into nonvolatile EEPROM memory cells, eliminating the need for external A/D and D/A circuits. This delivers a single chip, solid-state solution that requires no software, unlike other alternatives which are more difficult to integrate. Furthermore, ChipCorder® technology offers high-quality voice reproduction because the voice signal is stored in its direct form and not encoded or compressed. Recorded messages are retained after batteries wear out. ChipCorder® devices can be recorded and re-recorded reliably over 100,000 times.

Of course, many other memory systems may be utilized instead of ISD devices, and the present invention is not intended to be limited to use with any particular memory manufacturer.

Figure 4:
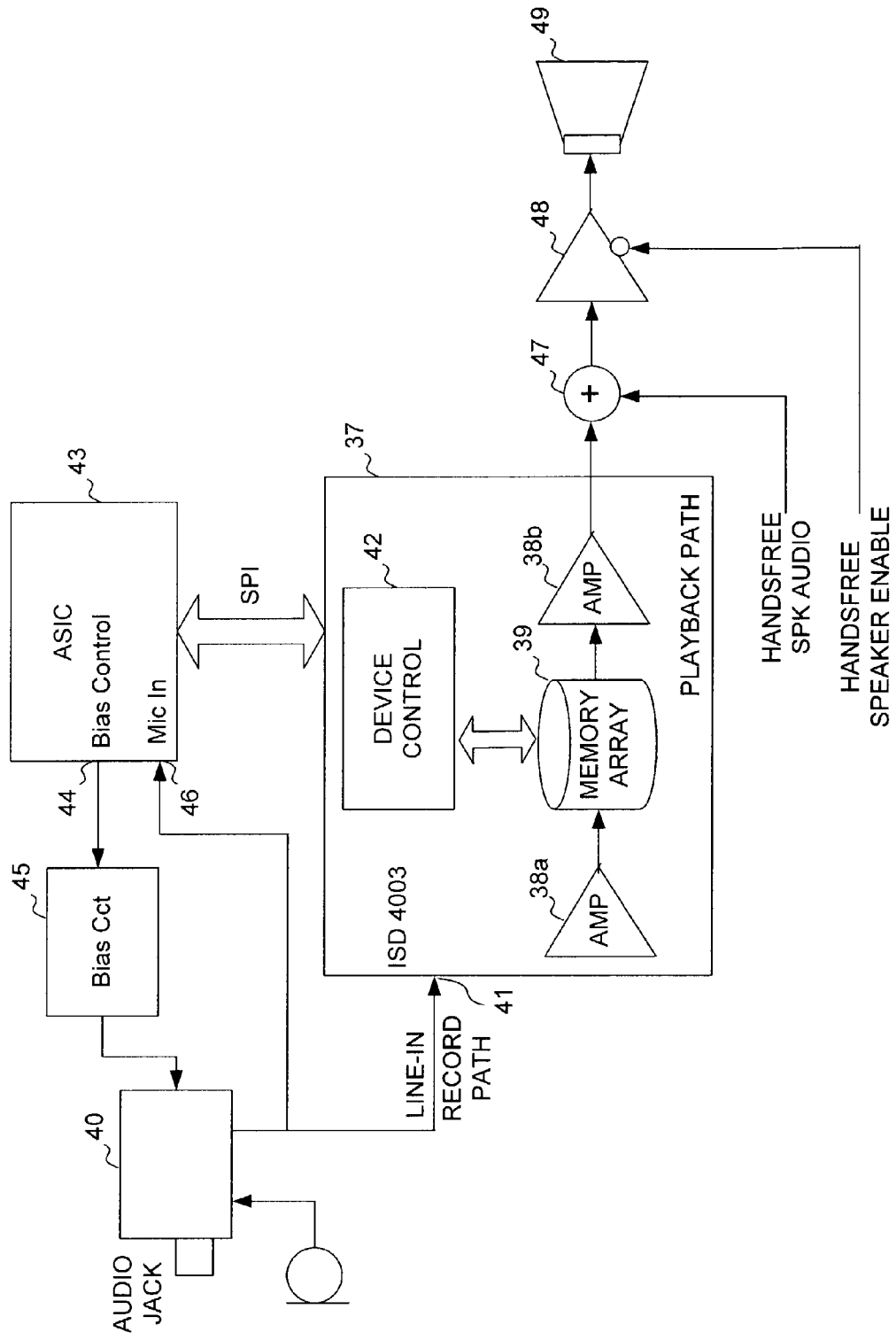
FIG. 4 is a schematic diagram of a connection of an audio jack to a specialized memory unit in a handset in accordance with an embodiment of the present invention.

Specialized memory 37 is a self-contained unit comprising amplifiers 38*a* and 38*b* and a memory array 39. When the handset is configured to play back a stored song excerpt, the music is retrieved from memory array 39, amplified in integrated amplifier 39*b* and directly output to a speaker on the handset. FIG. 4 is a schematic diagram of a configuration of specialized memory 37 within the handset. Particularly, incoming audio signals from audio jack 40 are fed into an ISD 4003 memory chip via a Line_In 41. Memory 37 is controlled by Device Control 42, which is in communication with ASIC 43 in the handset. The ASIC provides bias control 44 for a DC bias to a bias circuit 45 to the audio jack 40, and includes an input line for detecting a signal at the jack, MIC_IN 46.

The method and apparatus for customizing ring tones in a cordless telephone system is preferably implemented in a cordless telephone handset that already has capabilities for playing high quality, polyphonic audio signals in an external speaker (as opposed to a piezoelectric ringer). In this manner, it is not necessary to add a speaker and speaker driver, which affect the external design and configuration of the handset. Many cordless telephone systems are already equipped with these components as part of a conference phone capability integrated within the handset. That is, the handset can operate in any of three possible modes: normal mode, headset mode, or conference speakerphone mode. To incorporate the customized ring tones within such a system, additional summer equipment 47 and toggle devices 48 will be required for sharing the speaker 49.

Instead of utilizing a specialized memory unit for storing the audio ring tone signals, it is possible to use any other type of conventional memory. In that case, it is typically necessary to digitize the sample, provide CODECs, and use a DSP engine to compress the file to a lower bit rate.

Figure 5:
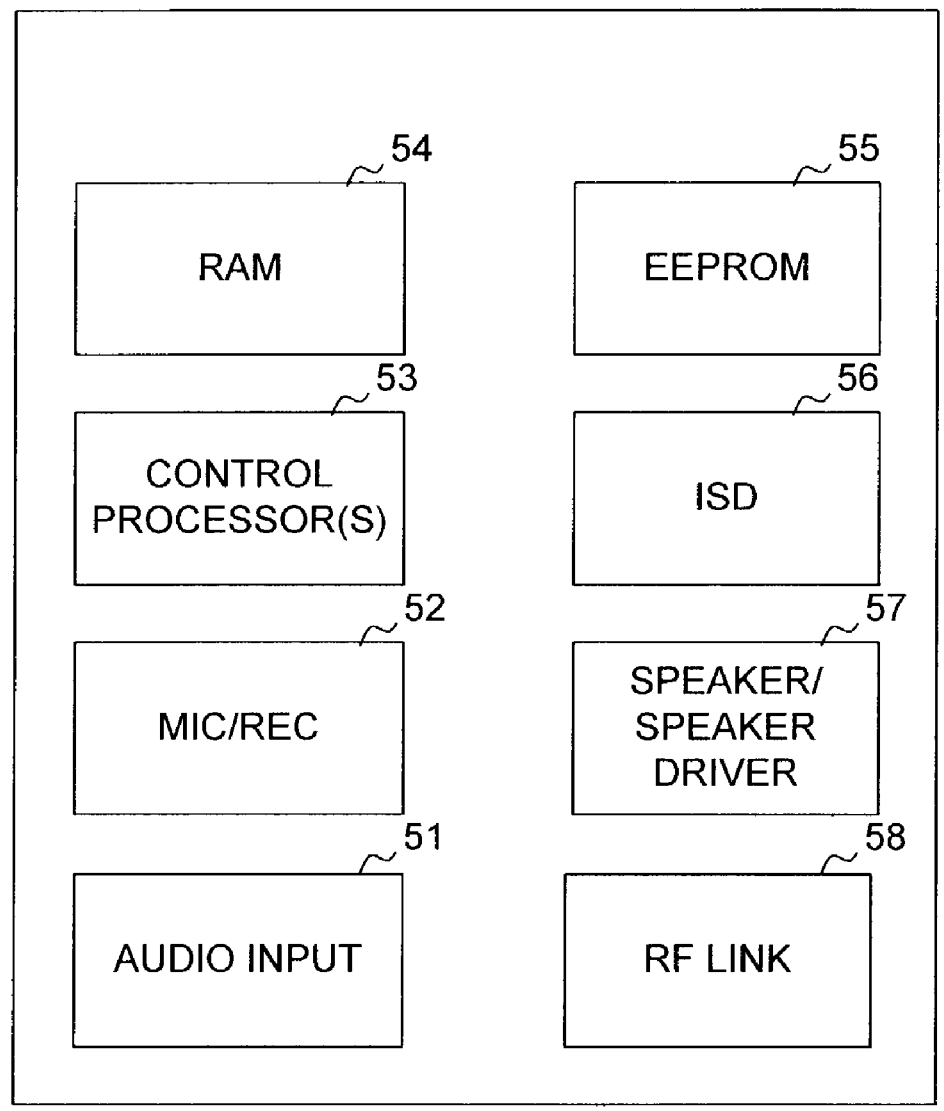
FIG. 5 is a schematic diagram of components of a handset in a cordless telephone in accordance with an embodiment of the present invention.

FIG. 5 is a schematic diagram illustrating various components interconnected within a handset, including other types of memory (this is not intended to show a serial connection between each of these components). In particular, once a user enters into a "programming" mode in controller 53 to acquire an audio signal, the controller disables the integrated microphone and receiver 52 in the handset and waits to detect an incoming audio signal at the audio input 51 (the microphone/speaker may be automatically disabled when a line_in is detected at the audio input jack). Depending upon how the controller is programmed, an incoming audio signal is then fed directly into ISD 56, as described above, or it is converted to a digital signal, encoded for digital compression, and stored in a programmable memory (such as EEPROM 55). In either case, when a control signal is received from the PSTN at the base unit (not shown) to generate a ring signal, an internal signal is generated by a controller in the base unit and transmitted to the handset via an RF link 58. This signal is demodulated and directed to controller 53, which then retrieves the ring signal audio information from the ISD or other programmable memory. From there, it is amplified and sent to a speaker driver and an external speaker 57.

Figure 6:
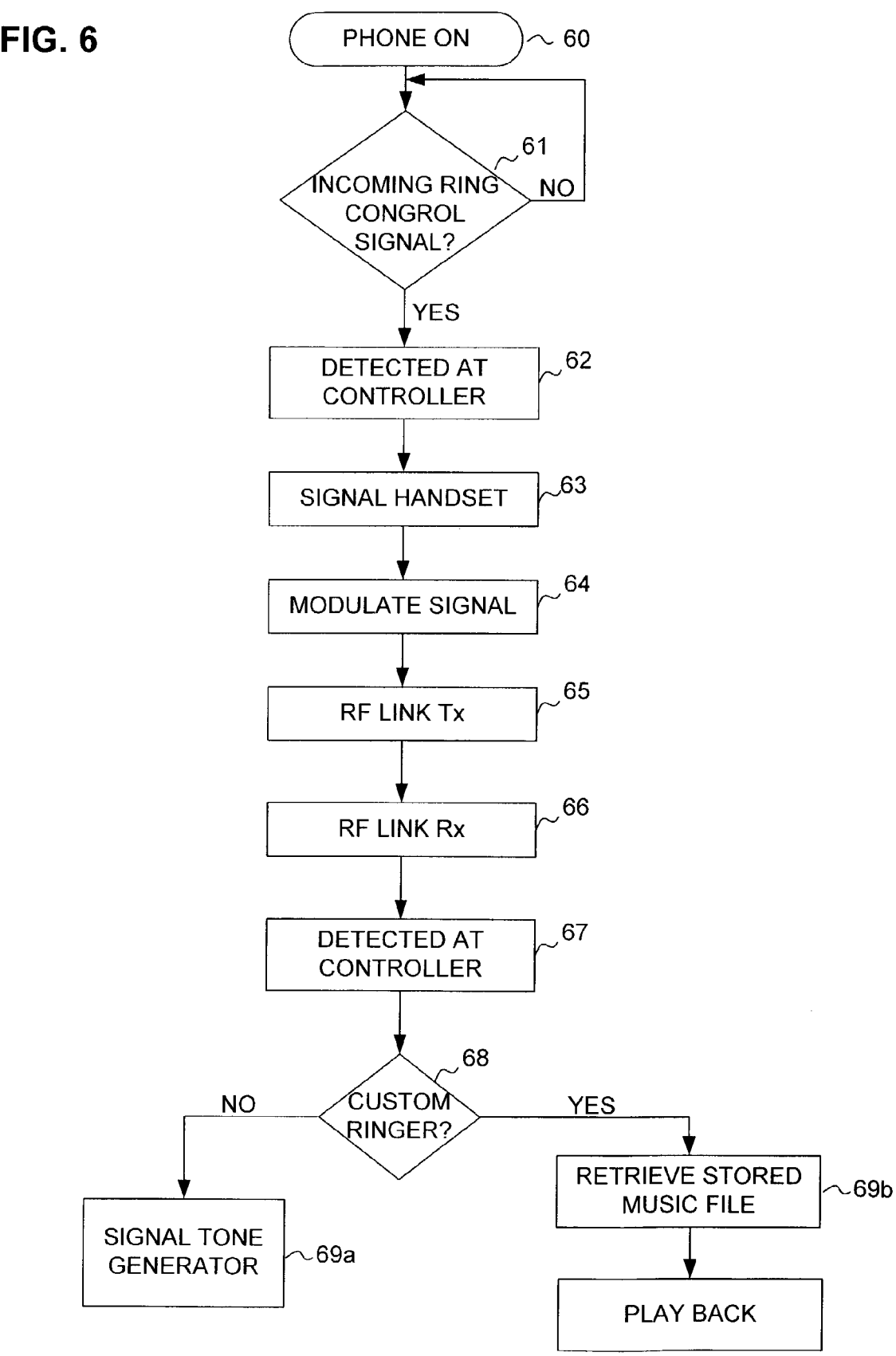
FIG. 6 is a flow diagram of a method for retrieving and playing back a customized ring tune in accordance with another embodiment of the present invention.

FIG. 6 is a flow diagram of the steps for generating a customized ring signal in a cordless telephone in accordance with an embodiment of the present invention. Once the telephone system is powered "on," in step 60, the controller in the base unit waits in step 61 for an incoming ring control signal. This signal prompts a digital telephone to commence generation of a tone signal as a ringer. Once this is detected in step 62, the controller generates an internal signal in step 63, modulates 64 for RF communication (typically at 900 MHz or 2.4 GHz, although higher frequencies are now available), and transmits 65*a* the signal to be received 66*b* at an RF receiver in the handset. The signal is then detected in step 67 at the handset controller, where it is determined whether a customized ring signal is available. If not, the handset controller sends a tone generator signal 69*a*, as is known. However, if a customized signal is available, the controller retrieves the stored music file 69*b* from memory for play back.

Figure 7:
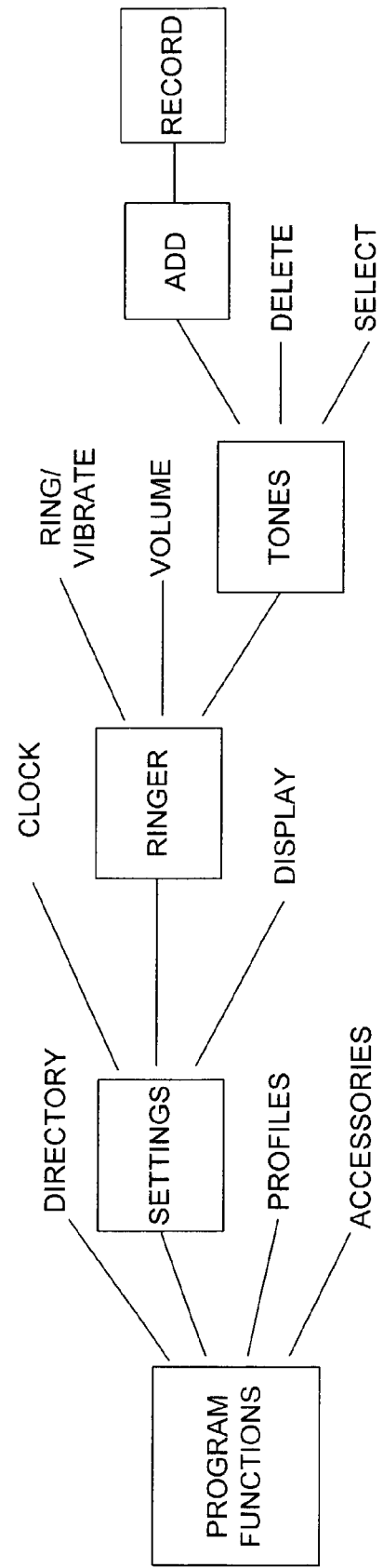
FIG. 7 is an illustration of an exemplary menu hierarchy in a telephone in accordance with an embodiment of the present invention.

FIG. 7 illustrates a menu system available over a graphical user interface (GUI) display in a cordless telephone system configured in accordance with an embodiment of the present invention. As can be seen, the menu is a tiered list of options of features associated with operation the telephone. The "boxed" or highlighted entries provided in the figure are chosen in order to add a new personalized tune to memory for playback as a ring tone. The menu illustrates a possible user navigation of an interface for use with the present invention, and is not intended to limit the scope of the invention to any particular features or ordering of features.

The first tier of the menu hierarchy allows a user to select between a telephone communications-related feature (e.g., voicemail) and other program functions, such as access to a telephone directory, accessories (e.g., calculator, calendar), and adjustment of settings and profiles. If "settings" is chosen, the user can adjust, for example, clock settings, the format of the display, and the ringer. Relating to an embodiment of the invention, a selection of the "ringer" feature allows a user to configure the ringer, such as ring volume, toggling between a ringer and a vibrating mode and configuration of the ring tone. Once the user selects "ring tone" to enter the 5$^{th}$ tier of the menu, a submenu of ringer options can be presented to enable the user to record a new song excerpt as a ring tone. Optionally, several different songs can be stored in memory as a directory of ring tones, which may be individually selected, or set for alternating playback. As described below, a flow diagram is provided in FIG. 9 for uploading a sample into the telephone, in accordance with an embodiment of the present invention.

In addition to conference/speakerphone capabilities, many modern cordless telephone also include functionality for an integrated digital voicemail system, such that incoming voice messages received when a user is unavailable are recorded in memory within the base unit. Integrated voicemail systems either digitize the incoming voice signal for storage in conventional semiconductor memory, or store the voice signals within specialized memories that do not require encoding for storage and decoding of the signal for playback. Cordless telephone systems that include such integrated voicemail systems typically store the voice data in the base unit of the cordless telephone. If an integrated voicemail system is included, it may be preferable to store the customized ring tunes in the base unit instead of utilizing two distinct memory systems in the base unit and handset.

Figure 8:
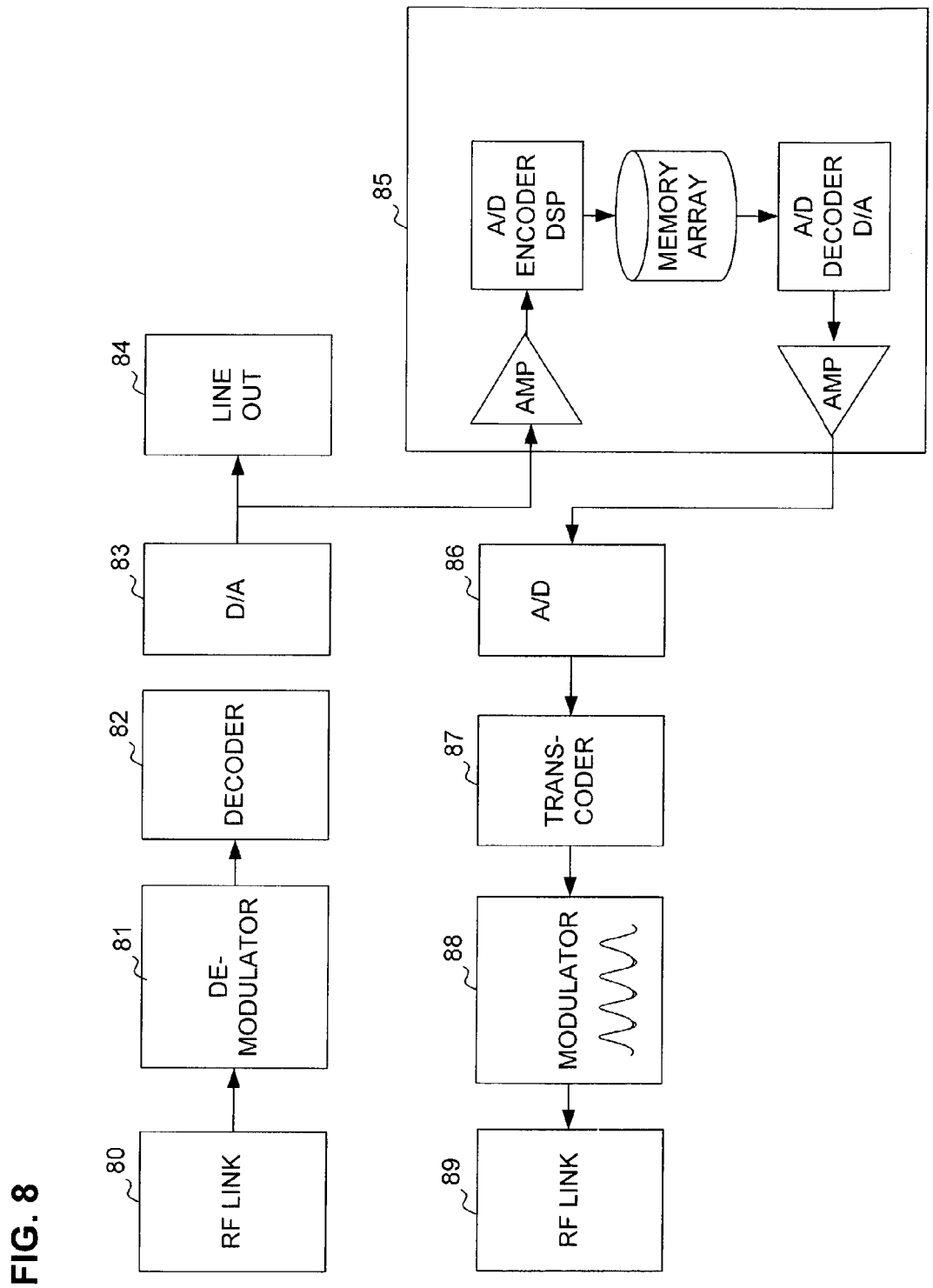
FIG. 8 is a schematic diagram of illustrating a bypass arrangement for receiving and transmitting audio signals in a base unit, according to an alternative embodiment of the present invention.

FIG. 8 is a schematic diagram illustrating the connection of a memory array within a base unit of a cordless telephone, in accordance with an alternative embodiment of the present invention. In this embodiment, the audio signal is still input at the headset jack in the handset. From there, the audio signal is filtered, sampled, transcoded, modulated, and uplinked for an RF communication, in the same manner as when a voice signal is transmitted from the handset to the base unit during a voice communication, as shown in FIGS. 1 and 3. Upon being received at the base unit, the signal must be demodulated 81, decoded 82, and converted back to an analog signal 83 before being input to memory shared with the voicemail system. FIG. 8 shows the memory unit 85 as including amplifiers, CODECs, and a DSP engine for compressing the data for a low-bit rate for storage. Alternatively, the specialized memory such as ChipCorder® can be used for storing the audio samples as well as voicemail messages.

Although this step of coding and decoding the signal may somewhat diminish signal quality, the signal will be re-coded and decoded anyway when it is retransmitted to the handset to be sent to the external speaker. When a control signal is detected in the base controller from the PSTN, the controller (not shown) retrieves the song excerpt from specialized memory 85 and digitizes the signal 86, compresses the signal 87, and modulates 88 and uplinks the signal 89 for communication to the handset. Once it is converted back to an analog signal, special programming in the handset then directs the signal to the external speaker.

As yet another alternative embodiment, an additional audio input jack may be located in the base unit when the audio signal is to be stored memory within the base unit. Since the information will not have to be transmitted over the RF link between the headset and base unit during configuration, this saves steps as the information is input to memory.

Figure 9:
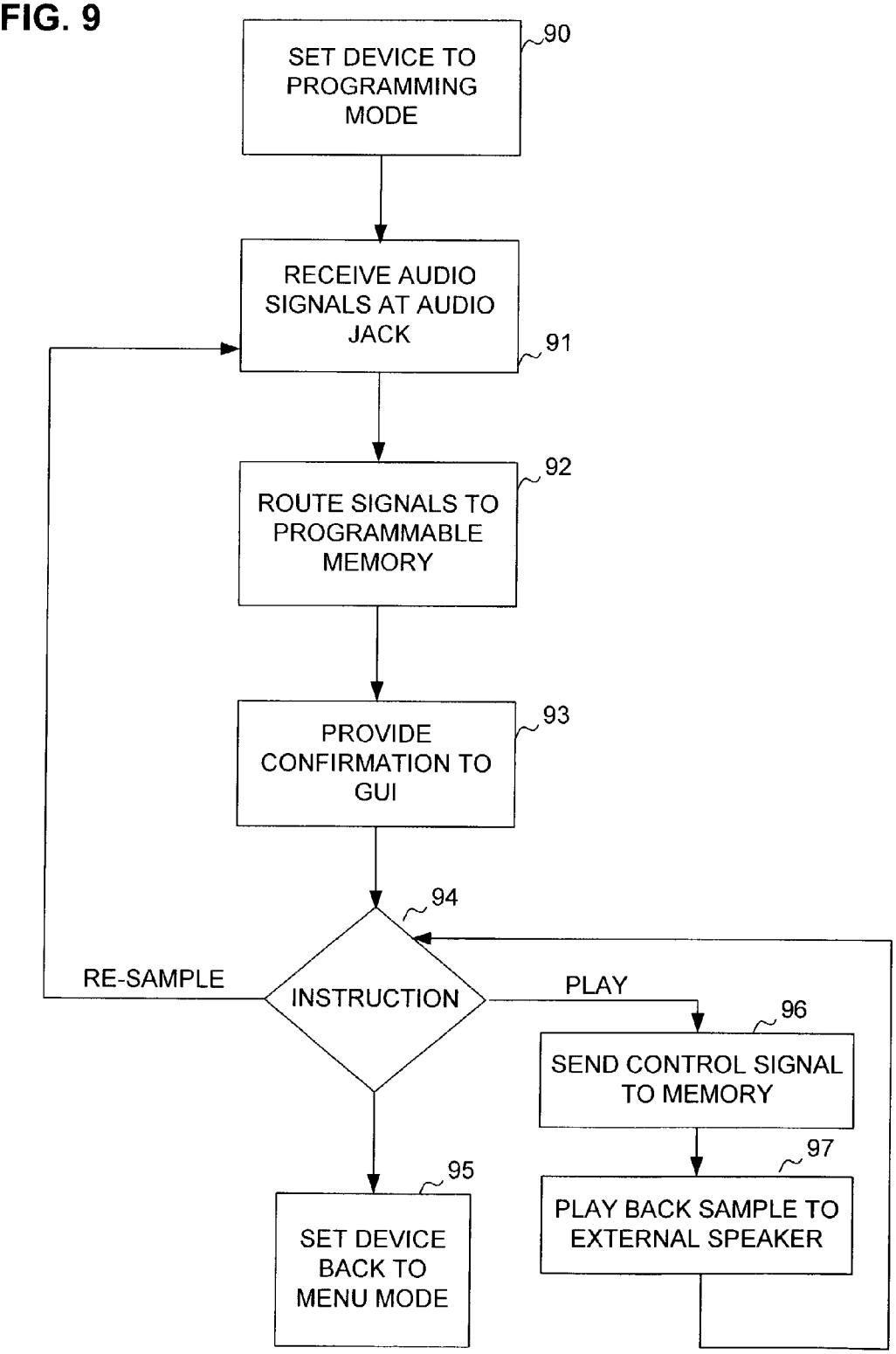
FIG. 9 is a flow diagram of a method for uploading an audio sample to memory of a telephone, in accordance with an embodiment of the present invention.

FIG. 9 is a flow diagram illustrating steps for uploading audio signals to memory of a telephone in accordance with an embodiment of the present invention. In step 90, the telephone is set to a "programming" mode to input the audio signal. When in this mode, the telephone is "listening" for an audio signal input to the audio jack of the telephone. Optionally, the graphical user interface might display a counter (e.g., counting down until recording, and then counting up during the recording). As audio signals are received in step 91, the telephone is programmed to route the signals to programmable memory in step 92. Whether the telephone must filter, condition and digitize the signal depends upon whether a standard EEPROM or an ISD memory is utilized, and whether the memory is located in the handset or base (of a cordless telephone). Upon completion of recording, confirmation is provided to the user on the graphical user display in step 93. At this stage, the user may be prompted to choose in step 94 whether re-record the sample, complete the sampling process and return to the general menu (in step 95), or playback the sample to determine whether to save it. If playback is chosen, the telephone controller sends a control signal to memory to retrieve the sample in step 96, and then playback the sample to an external speaker in step 97.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for providing user-downloaded audio signals as ring tones in a cordless telephone, comprising:
   receiving a user-downloaded audio signal comprising a musical excerpt at an input jack of a handset of the cordless telephone;
   storing the user-downloaded audio signal in telephone memory of the cordless telephone;
   receiving a ring control signal to generate a ring tone;
   retrieving the stored user-downloaded audio signal in response to the ring control signal; and
   providing the retrieved user-downloaded audio signal to an external telephone speaker of the handset of the cordless telephone,
   wherein the cordless telephone comprises the handset and a base unit,
   wherein the telephone memory is located in the base unit,
   wherein the user-downloaded audio signal is received at the input jack of the handset and digitized and transmitted from the handset to the base unit memory via an RF communication, and
   wherein the retrieving the stored user-downloaded audio signal comprises:
      retrieving the user-downloaded audio signal from the base unit memory;
      compressing the user-downloaded audio signal;
      modulating the user-downloaded audio signal; and
      uplinking the user-downloaded audio signal for transmission to the handset via an RF communication.

2. The method of claim 1, further comprising a telephone memory located in the handset that also stores the user-downloaded audio signal.

3. The method of claim 1, wherein the telephone memory is an ISD chip.

4. The method of claim 1, wherein the user-downloaded audio signal is received as an analog signal.

5. The method of claim 4, wherein the user-downloaded audio signal is received from any of a CD player, radio, VCR, television, DVD player, computer, or MP3 player.

6. A cordless telephone for providing user-downloaded audio samples as ring tones, comprising:
   an audio input jack of a handset of the cordless telephone for receiving a user-downloaded audio signal comprising a musical excerpt;
   a memory for storing the received user-selected audio signal; and
   a controller for retrieving the stored user-downloaded audio signal in response to a command to generate a ring tone,
   wherein the cordless telephone comprises a base unit and the handset, the stored user-downloaded audio signal being provided to a speaker on the handset,
   wherein the memory is located in the base unit,
   wherein the handset:
      receives the user-downloaded audio signal through the audio input jack and digitizes and transmits the user-downloaded audio signal to the base unit memory via an RF communication, and
   wherein the base unit:
      retrieves the user-downloaded audio signal from the base unit memory;
      compresses the user-downloaded audio signal;
      modulates the user-downloaded audio signal; and
      upliniks the user-downloaded audio signal for transmission to the handset via an RF communication.

7. The telephone of claim 6, wherein the command is a control signal transmitted over a PSTN to generate a ring tone to indicate a call request.

8. The cordless telephone of claim 6, further comprising a user interface for receiving user commands to switch to a programming mode from an operation mode, wherein stored user-downloaded audio signals received at the interface are stored in memory when the telephone is switched to a programming mode.

9. The cordless telephone of claim 8, wherein the user interface prompts a user to select between re-recording an audio signal, saving an input signal, or playing back the signal.

10. The cordless telephone of claim 8, wherein the user interface is adapted for receiving audio signals from an audio output jack of at least one of a compact disc player, DVD player, radio, television, or computer.

11. A method for configuring a telephone to provide stored user-downloaded audio samples as ring tones, comprising:
   connecting an audio source to an input jack of a handset of a cordless telephone;
   selecting to store an audio signal in telephone memory of the cordless telephone; and
   playing the audio source to download an audio signal and store the downloaded audio signal in the telephone memory while the telephone is in a recording mode, wherein the audio signal is a musical excerpt,
   wherein, upon detection of a ring control signal to generate a ring tone, the stored user-downloaded audio signal is retrieved from the telephone memory, amplified and provided to an external telephone speaker as a ring tone, and
   wherein the cordless telephone comprises a base unit and the handset, the external telephone speaker being located on the handset,
   wherein the telephone memory is located in the base unit,
   wherein the user-downloaded audio signal is received at the audio input jack of the handset and digitized and transmitted from the handset to the base unit memory via an RF communication, and
   wherein retrieving the stored user-downloaded audio signal comprises:
      retrieving the user-downloaded audio signal from the base unit memory;
      compressing the user-downloaded audio signal;
      modulating the user-downloaded audio signal; and
      upliniking the user-downloaded audio signal for transmission to the handset via an RF communication.

12. The method of claim 11, further comprising the steps of storing a plurality of audio signals in telephone memory, and selecting one of the stored audio signals for playback.

13. The method of claim 11, wherein a user selects to store an audio signal in telephone memory on a user interface by switching the telephone from an operating mode to a programming mode.

14. The method of claim 11, wherein the audio source is at least one of a compact disc player, DVD player, radio, television, and computer.

15. The method of claim 14, wherein the audio signal is received as an analog signal.

16. The method of claim 15, wherein the audio signal is stored in memory during power off.

* * * * *